US011997302B2

(12) United States Patent
Gondo et al.

(10) Patent No.: US 11,997,302 B2
(45) Date of Patent: May 28, 2024

(54) ENCODING DEVICE, DECODING DEVICE, STREAMING SYSTEM, AND STREAMING METHOD (71) Applicant: Kabushiki Kaisha Toshiba, Tokyo (JP)

(72) Inventors: Shunichi Gondo, Ota (JP); Tomoya Kodama, Kawasaki (JP); Takeshi Chujoh, Kawasaki (JP); Akiyuki Tanizawa, Kawasaki (JP); Takayuki Itoh, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/591,127

(22) Filed: Feb. 2, 2022

(65) Prior Publication Data
US 2022/0159288 A1 May 19, 2022

Related U.S. Application Data (63) Continuation of application No. 14/842,214, filed on Sep. 1, 2015, now abandoned.

(30) Foreign Application Priority Data

Sep. 19, 2014 (JP) .................. 2014-191604

(51) Int. Cl.
*H04N 19/50* (2014.01)
*H04N 21/236* (2011.01)
*H04N 21/2365* (2011.01)

(52) U.S. Cl.
CPC ....... *H04N 19/50* (2014.11); *H04N 21/23602* (2013.01); *H04N 21/2365* (2013.01)

(58) Field of Classification Search
CPC ......... H04N 21/23602; H04N 21/2365; H04N 19/50

(Continued)

(56) References Cited

U.S. PATENT DOCUMENTS 6,795,501 B1  9/2004 Zhu
7,245,660 B2 * 7/2007 Yona .................. H04N 19/61
                                                 375/E7.199

(Continued)

FOREIGN PATENT DOCUMENTS

JP   11-341488 A   12/1999
JP   2001-522207 A  11/2001

(Continued)

OTHER PUBLICATIONS

Sakae Okubo, et al., "Impress standard textbook series Three revision H. 264/AVC Textbook", Impress R&D, 2009, pp. 286-305, with English machine translation, (35 Pages).

*Primary Examiner* — Amir Shahnami
*Assistant Examiner* — Jimmy S Lee
(74) *Attorney, Agent, or Firm* — Oblon, McClelland, Maier & Neustadt, L.L.P.

(57) ABSTRACT

According to an embodiment, an encoding device includes an encoder. The encoder is configured to generate a video stream. The video stream includes at least a first image group including a plurality of images encoded at a first bit rate and a second image group including a plurality of images. The first image group includes an intra-coded image. The plurality of images of the second image group are associated with the intra-coded image serving as a reference image to decode an inter-coded image, and are encoded at a second bit rate different from the first bit rate and having reproduction timing in synchronization with the plurality of images of the first image group.

12 Claims, 9 Drawing Sheets (58) Field of Classification Search
USPC .................................................. 375/240.13
See application file for complete search history.

(56) References Cited

U.S. PATENT DOCUMENTS

| | | | |
|---|---|---|---|
| 7,492,819 B2 * | 2/2009 | Honda | H04N 19/587 |
| | | | 375/240.03 |
| 7,853,981 B2 | 12/2010 | Seo | |
| 8,340,183 B2 | 12/2012 | Oguz et al. | |
| 8,773,584 B2 | 7/2014 | Sasaki et al. | |
| 9,060,201 B2 | 6/2015 | Labrozzi et al. | |
| 9,485,526 B2 | 11/2016 | Hybertson | |
| 2003/0123537 A1 * | 7/2003 | Yona | H04N 7/152 |
| | | | 375/E7.199 |
| 2003/0138043 A1 * | 7/2003 | Hannuksela | H04N 19/577 |
| | | | 375/E7.146 |
| 2008/0062306 A1 * | 3/2008 | Mori | H04N 21/4425 |
| | | | 348/394.1 |
| 2008/0267291 A1 * | 10/2008 | Vieron | H04N 19/30 |
| | | | 375/E7.17 |
| 2008/0273596 A1 * | 11/2008 | Oguz | H04N 21/44016 |
| | | | 375/E7.023 |
| 2013/0002821 A1 | 1/2013 | Okuda | |
| 2013/0202034 A1 | 8/2013 | Yu et al. | |
| 2013/0301723 A1 | 11/2013 | Abe et al. | |
| 2013/0343668 A1 * | 12/2013 | Li | H04N 19/174 |
| | | | 382/244 |
| 2014/0003507 A1 | 1/2014 | Asano et al. | |
| 2014/0020037 A1 | 1/2014 | Hybertson | |
| 2015/0156511 A1 | 6/2015 | Lunberg | |
| 2015/0163505 A1 | 6/2015 | Sato | |
| 2016/0065994 A1 * | 3/2016 | Kokaska | H04N 21/23608 |
| | | | 375/240.26 |

FOREIGN PATENT DOCUMENTS

| | | |
|---|---|---|
| JP | 2002-64817 A | 2/2002 |
| JP | 2005-110244 A | 4/2005 |
| JP | 2006-279971 A | 10/2006 |
| JP | 2012-70427 A | 4/2012 |
| JP | 2014-11731 A | 1/2014 |
| WO | WO 2011/118216 A1 | 9/2011 |
| WO | WO 2012/098890 A1 | 7/2012 |
| WO | WO 2014/050677 A1 | 4/2014 |

* cited by examiner

ENCODING DEVICE, DECODING DEVICE, STREAMING SYSTEM, AND STREAMING METHOD

CROSS-REFERENCE TO RELATED APPLICATION

This application is a continuation of U.S. patent application Ser. No. 14/842,214, filed on Sep. 1, 2015, which is based upon and claims the benefit of priority from Japanese Patent Application No. 2014-191604, filed on Sep. 19, 2014; the entire contents of which are incorporated herein by reference.

FIELD

Embodiments described herein relate generally to an encoding device, a decoding device, a streaming system, and a streaming method.

BACKGROUND

In this day, adaptive streaming is known as a technology for transmitting a video stream through a network. The adaptive streaming is a video transmission technology without interruption in video reproduction, changing a bit rate or the like of a video stream to be transmitted, according to change in network communication bandwidth.

In such an adaptive streaming, "dynamic encoding" and "multiple encoding" are known to change the bit rate or the like of the video stream to be transmitted. In the dynamic encoding, bandwidth prediction or the like is used in transmission processing to dynamically adjust the bit rate of the video stream generated by an encoder. Further, in the multiple encoding, video streams having a plurality of bit rates are generated by the encoder, and a transmission/reception processing side dynamically selects, from the generated video streams having the bit rates, a video stream having a bit rate corresponding to bandwidth prediction or the like.

In the adaptive streaming using the multiple encoding, when a video source is converted by the encoder into video streams having a plurality of different bit rates, all of the video streams are generated to be synchronized in reproduction time. Therefore, it can be achieved that, for example, a video stream having a higher bit rate is reproduced for the first few seconds, a video stream having a lower bit rate is reproduced for the next few seconds, and a video stream having a medium bit rate is reproduced for an additional few seconds. This configuration allows that even if the video streams having the different bit rates are switched from one to another during reproduction, the video can be reproduced without interruption.

In the adaptive streaming using the multiple encoding, the video source is converted by the encoder into the video streams having the plurality of different bit rates. However, all of the video streams are independent of each other.

Therefore, there has been a problem that the switching of the video streams is limited to a random access time between the video streams (usually, I-picture or the like at the head of the GOP or the like). The GOP is short for "group of pictures". The I-picture is an intra-coded image.

Further, there has been a problem that when acquisition of the video stream cannot be completed during a reproduction time of the video stream although the acquisition of the video stream is started, the video reproduction is interrupted. Additionally, there has been a problem that when the video is transmitted particularly on a network having a bad condition, the video stream having a higher bit rate cannot be acquired easily. Further, there has been a problem that a longer buffering time is required to accomplish the acquisition of the video stream within the reproduction time of the video stream. Still further, there has been a problem that the video to be reproduced disadvantageously brings about deterioration in quality, increase in delay, or the like.

As described above, in the adaptive streaming using the multiple encoding, there has been problems in reproduction efficiency and reproduction quality.

DETAILED DESCRIPTION

According to an embodiment, an encoding device includes an encoder. The encoder is configured to generate a video stream. The video stream includes at least a first image group including a plurality of images encoded at a first bit rate and a second image group including a plurality of images. The first image group includes an intra-coded image. The plurality of images of the second image group are associated with the intra-coded image serving as a reference image to decode an inter-coded image, and are encoded at a second bit rate different from the first bit rate and having reproduction timing in synchronization with the plurality of images of the first image group.

While certain embodiments have been described, these embodiments have been presented by way of example only, and are not intended to limit the scope of the inventions. Indeed, the novel devices, systems, and methods described herein may be embodied in a variety of other forms; furthermore, various omissions, substitutions and changes in the form of the devices, systems, and methods described herein may be made without departing from the spirit of the inventions. The accompanying claims and their equivalents are intended to cover such forms or modifications as would fall within the scope and spirits of the inventions.

As one example, a streaming system to which an encoding device, a decoding device, a streaming system, and a streaming method are applied will be described below according to embodiments. First, as one example, the streaming system according to a first embodiment employs an adaptive streaming system using multiple encoding. As described below, in the streaming system according to the first embodiment, when an encoder converts a video source (master data) into streams having different bit rates, the streams are generated as video streams having correlation with one another (generating a meta file, in some cases), and when the video streams are switched from one to another, a different video stream is acquired in consideration of the correlation.

First Embodiment

Figure 1:
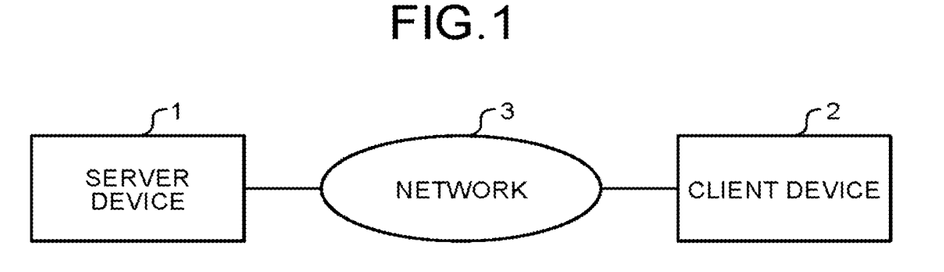
FIG. 1 is a configuration diagram of a streaming system according to a first embodiment.

In FIG. 1, a configuration diagram of the streaming system according to the first embodiment is illustrated. As illustrated in FIG. 1, the streaming system according to the first embodiment includes a server device 1 and a client device 2. The server device 1 and the client device 2 are connected to each other through a network 3 such as the Internet. The server device 1 encodes, as described below, a predetermined video stream to be distributed through the network 3. The client device 2 receives the video stream from the server device 1, and decodes the video stream to be displayed on a monitor device or to be stored in a recorder device or the like.

Figure 2:
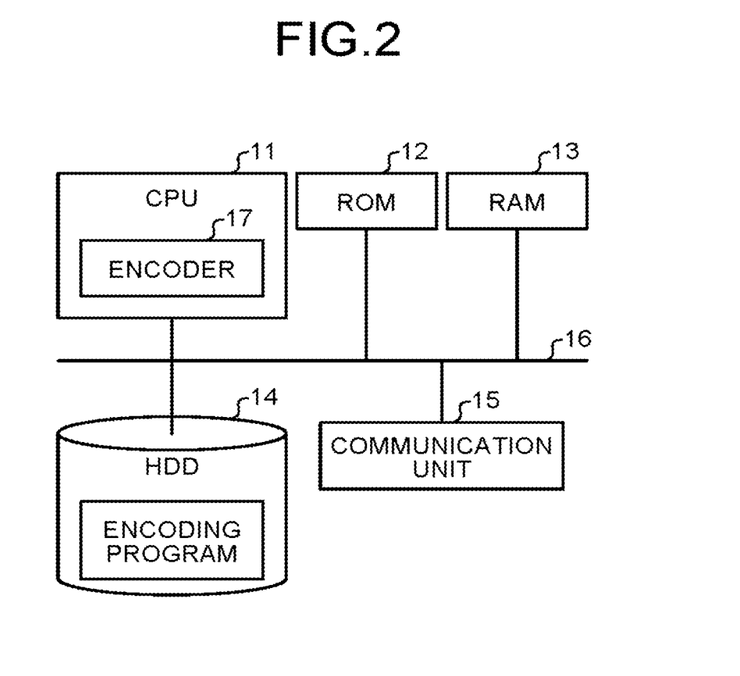
FIG. 2 is a block diagram of a server device provided in the streaming system according to the first embodiment.

In FIG. 2, a block diagram of the server device 1 is illustrated. As illustrated in FIG. 2, the server device 1 has a hardware configuration similar to a normal personal computer device. That is, the server device 1 includes a CPU 11, a ROM 12, a RAM 13, a hard disk drive (HDD) 14, and a communication unit 15. The CPU 11, the ROM 12, the RAM 13, the HDD 14, and the communication unit 15 are connected to each other through a bus line 16. The CPU is short for "central processing unit". The ROM is short for "read only memory". The RAM is short for "random access memory".

The HDD 14 stores an encoding program for encoding the video stream. The CPU 11 is operated according to the encoding program to function as the encoder 17 as an example of an encoding unit, and encodes and distributes the video stream. The encoding program may be stored in the ROM 12 or the RAM 13.

Figure 3:
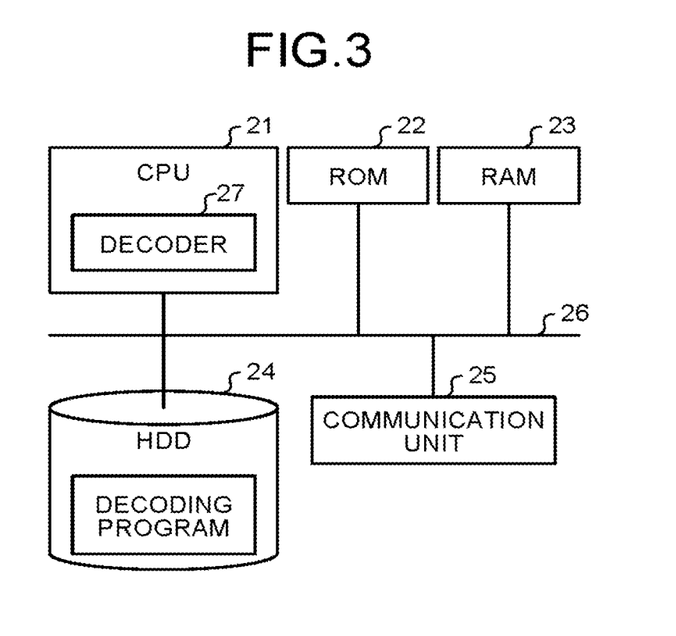
FIG. 3 is a block diagram of a client device provided in the streaming system according to the first embodiment.

In FIG. 3, a block diagram of the client device 2 is illustrated. As illustrated in FIG. 3, the client device 2 has a hardware configuration similar to a normal personal computer device. That is, the client device 2 includes a CPU 21, a ROM 22, a RAM 23, a hard disk drive (HDD) 24, and a communication unit 25. The CPU 21, the ROM 22, the RAM 23, the HDD 24, and the communication unit 25 are connected to each other through a bus line 26. The communication unit 25 is one example of a receiver.

The HDD 24 stores a decoding program for decoding the video stream received from the server device 1. The CPU 21 is operated according to the decoding program to function as a decoder 27 as an example of a decoding unit, and decodes the video stream received from the server device 1. The decoding program may be stored in the ROM 22 or the RAM 23.

In this example, a description will be made on the assumption that the encoder 17 and the decoder 27 are achieved by software. However, all or any of the encoder 17 and the decoder 27 may be achieved by hardware.

Further, the encoding program and the decoding program may be provided to be stored in a computer-readable storage medium which may be provided as a computer program product, such as a CD-ROM or a flexible disk (FD) as a file in installable or executable format. Alternatively, the encoding program and the decoding program may be provided to be recorded in a computer-readable recording medium such as a CD-R, a DVD, a Blu-ray Disc (registered trademark), or a semiconductor memory. The DVD is short for "digital versatile disk". Additionally, the encoding program and the decoding program may be provided to be installed on a network such as the Internet. Further additionally, the encoding program and the decoding program may be provided to be previously incorporated into a ROM or the like in a device.

Next, a description will be made of operation of transmission reception of the video stream in the streaming system according to the first embodiment. First, the encoder 17 of the server device 1 encodes the video source divided into predetermined time slots to have different bit rates, and generates the GOP having each bit rate. As an example, the encoder 17 generates the GOPs each having a higher bit rate, a lower bit rate, and a bit rate between the higher bit rate and the lower bit rate (medium bit rate). The encoder 17 generates one video stream by assembling the GOP having each bit rate in the same time slot, and stores the one video stream in the HDD 14. The GOP having a higher bit rate is one example of a first image group having a first bit rate. The GOPs having the intermediate bit rate and the lower bit rate are one example of a second image group having a second bit rate. Each GOP of each video stream is configured to be independently reproduced.

It is noted that, in this example, the generated video stream is configured to be stored in the HDD 14, but when the video stream is distributed in real time, for example as a live video, the video stream is encoded in real time, and distributed to the client device 2.

Further, in this example, the encoder 17 is configured to assemble the GOP having each bit rate in the same time slot and generate one video stream. However, the encoder 17 may encode the video source so that one video stream only includes the GOP having one bit rate. In this configuration, the encoder 17 encodes the GOP having a higher bit rate, the GOP having a medium bit rate, and the GOP having a lower bit rate from the video source in the same time slot. The encoder 17 generates a first video stream including only the GOP having a higher bit rate, a second video stream including only the GOP having a medium bit rate, and a third video stream including only the GOP having a lower bit rate.

Further, the encoder 17 inserts, into a file of each video stream, reference information indicating the video stream including a reference image to be referenced upon decoding a P-picture. Alternatively, the encoder 17 adds, to each video stream, a reproduction control file indicating the video stream including the reference image to be referenced upon decoding the P-picture. The decoder 27 references the video stream designated by the reference information or the reproduction control file, and decodes the P-picture.

Next, the decoder 27 of the client device 2 measures a communication bandwidth of the video stream. The decoder 27 selects one of the bit rates of the GOP to be received according to the measured communication bandwidth. The decoder 27 makes, to the server device 1, a request for distribution of the video stream having the GOP having the selected bit rate.

Specifically, when there is enough available communication bandwidth, the decoder 27 makes a request for distribution of the video stream having the GOP having a higher bit rate. By contrast, when there is no available communication bandwidth, the decoder 27 makes a request for distribution of the video stream having the GOP having a lower bit rate. Further, when there is some available communication bandwidth, the decoder 27 makes a request for distribution of the video stream having the GOP having a medium bit rate.

The decoder 27 receives the video stream having the GOP having the selected bit rate from the server device 1. The decoder 27 decodes the received video stream, and displays the decoded video stream on the monitor device or the like. Alternatively, the decoder 27 outputs the received video stream to a recording device, and records the video stream in the recording medium.

It is noted that, in this example, the client device 2 is configured to calculate the network communication bandwidth, and makes, to the server device 1, the request for distribution of the GOP having a bit rate corresponding to the calculated communication bandwidth. However, the server device 1 may calculate the network bandwidth, and switch, for distribution, the bit rate of the GOP to be transmitted. Specifically, in a process for switching streaming in the adaptive streaming, a stream designation method can be extended and achieved by defining reference to each image.

Further, any device other than the client device 2 or server device 1, a router device, a dedicated measurement device, or the like may measure the network communication bandwidth, and the client device 2 or the server device 1 may receive a result of the measurement for use as information for switching the bit rate of the GOP. Further, the result of the measurement of the network communication bandwidth measured by the client device 2 may be received by the server device 1, and the server device 1 may switch the bit rate of the GOP. Alternatively, the result of the measurement about the communication bandwidth measured by the server device 1 may be received by the client device 2, and the client device 2 may switch the bit rate of the GOP.

Next, a detailed description will be made of encoding and decoding operations of the video stream in the streaming system according to the first embodiment. First, in a flowchart of FIG. 4, the flow of encoding operation of the server device 1 will be illustrated. Upon encoding the video stream, the CPU 11 of the server device 1 functions as the encoder 17. In step S1, the encoder 17 performs predetermined encoding processing by inserting reference information of the I-picture into each video stream so that other inter-coded images (P-picture) make reference to an intra-coded image (I-picture) of the video stream having a predetermined bit rate.

It is noted that, the I-picture is an image having intra-coded data decodable independently of other images. Further, the P-picture is an image only having inter-coded data representing a difference relative to a preceding frame. A B-picture may be employed with or in place of the P-picture. The B-picture is an image only having inter-coded data relative representing a difference relative to preceding and succeeding images.

Figure 5:
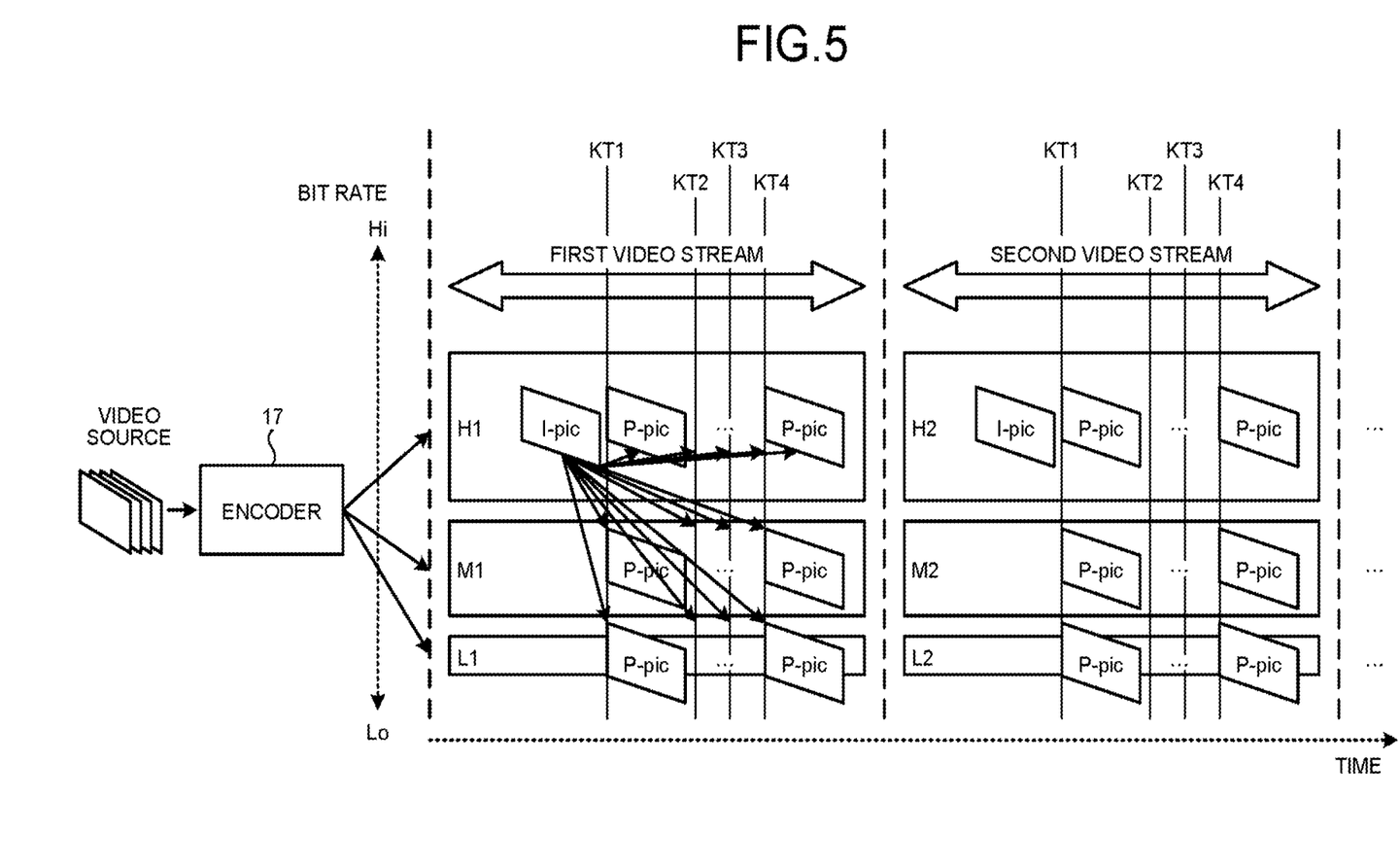
FIG. 5 is a schematic view illustrating an encoding operation in the server device of the streaming system according to the first embodiment.
Figure 6:
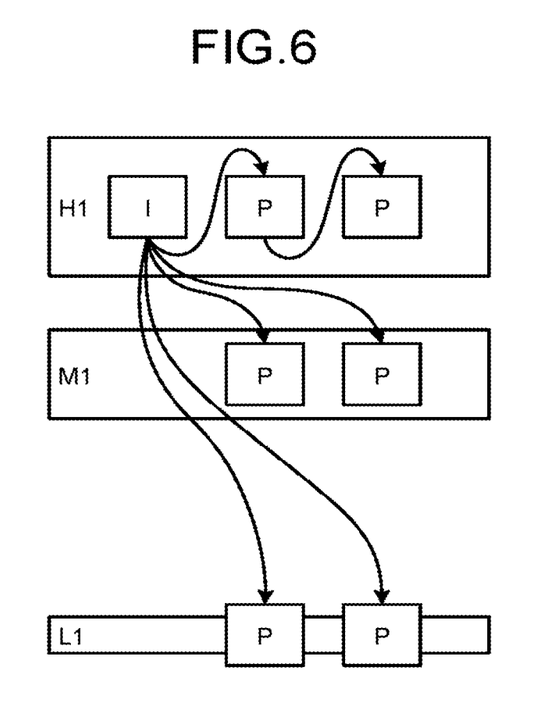
FIG. 6 is another schematic view illustrating an encoding operation in the server device of the streaming system according to the first embodiment.

In FIGS. 5 and 6, schematic views of encoding operations of the encoder 17 is illustrated. The encoder 17 encodes the video source according to the MPEG standard. Specifically, the encoder 17 encodes the video source each predetermined time, for example, encodes the video source for the first few seconds to generate the first video stream, and encodes the video source for the next few seconds following the video source for the first few seconds to generate the second video stream, and generates a sequential video stream.

As illustrated in FIGS. 5 and 6, the encoder 17 generates each video stream to include the GOP having a higher bit rate, the GOP having a medium bit rate, and the GOP having a lower bit rate. The GOP is short for "group of pictures". In FIG. 5, a reference sign "H1" denotes the GOP having a higher bit rate, included in the first video stream. Similarly, a reference sign "H2" denotes the GOP having a higher bit rate, included in the second video stream. Further, a reference sign "M1" denotes the GOP having a medium bit rate, included in the first video stream. Similarly, a reference sign "M2" denotes the GOP having a medium bit rate, included in the second video stream. Further, a reference sign "L1" denotes the GOP having a lower bit rate, included in the first video stream. Similarly, a reference sign "L2" denotes the GOP having a lower bit rate, included in the second video stream.

In examples illustrated in FIGS. 5 and 6, the encoder 17 performs encoding processing by designating the I-picture (I-pic) of the GOP having a higher bit rate, as an image to be referenced upon decoding the P-pictures (P-pic) of the GOP having each bit rate. Specifically, the encoder 17 inserts reference information for designating the I-picture to be referenced upon decoding the P-picture into a header or the like of each GOP. It is noted that, the encoder 17 may generate the reproduction control file indicating the I-picture to be referenced, and add the reproduction control file to each GOP or a corresponding video stream.

Figure 4:
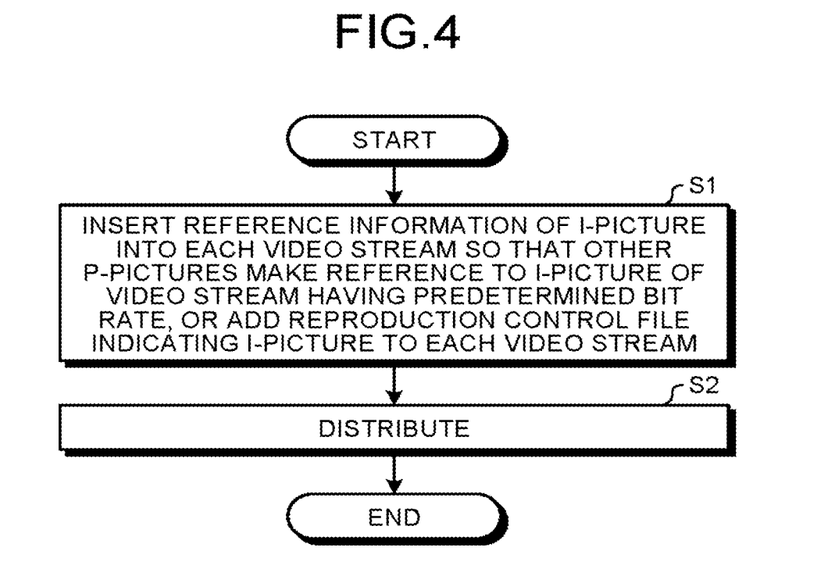
FIG. 4 is a flowchart illustrating an encoding operation in the server device of the streaming system according to the first embodiment.

In step S2 of a flowchart of FIG. 4, each video stream generated by the encoder 17 is distributed to each client device 2 while communication of the communication unit 15 is controlled by the CPU 11. Therefore, the process of the flowchart of FIG. 4 is finished.

Figure 7:
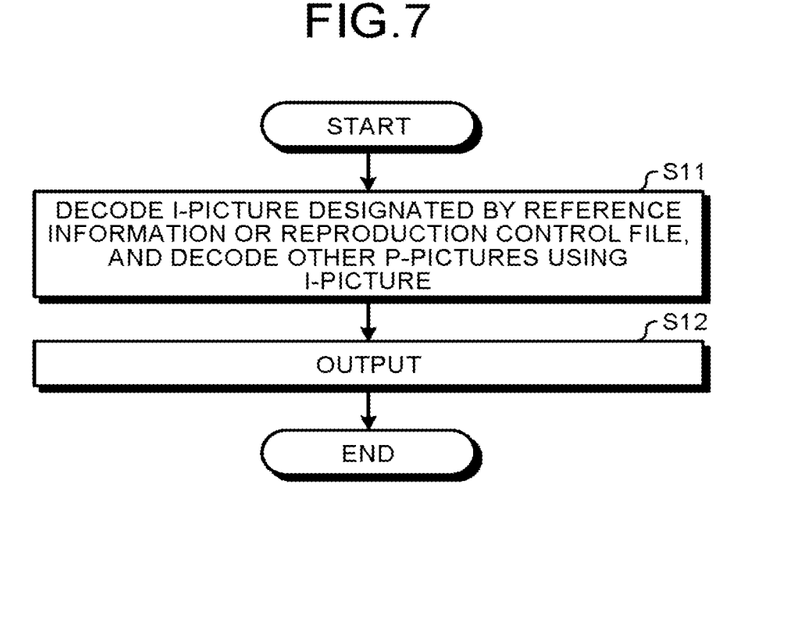
FIG. 7 is a flowchart illustrating a decoding operation in the client device of the streaming system according to the first embodiment.

Next, in a flowchart of FIG. 7, the flow of decoding the received video stream in the client device 2 is illustrated. The CPU 21 of the client device 2 functions as the decoder 27 according to the decoding program stored in the HDD 24, and decodes the video stream received from the server device 1.

Specifically, in step S11 of the flowchart of FIG. 7, when the video stream is received from the server device 1, the decoder 27 decodes the I-picture designated by the reference information or the reproduction control file. Further, the decoder 27 decodes the P-pictures of the GOP having the bit rate selected by a user, using the decoded I-picture.

FIGS. 5 and 6 illustrate decoding of the P-pictures of the GOP having each bit rate, using the decoded I-picture. It is noted that, FIGS. 5 and 6 illustrates an example of the I-picture of the GOP having a higher bit rate, designated by the reference information. In this configuration, the I-picture of the GOP having a higher bit rate is used to decode other P-pictures. However, for example, the I-picture of the GOP having a medium bit rate may be designated by the reference information. In this configuration, the I-picture of the GOP having a medium bit rate is used to decode other P-pictures. Further, the I-picture of the GOP having a lower bit rate may be designated by the reference information. In this configuration, the I-picture of the GOP having a lower bit rate is used to decode other P-pictures.

In step S12, the video stream decoded as described above is output to and displayed on the monitor device. Therefore, decoding of the flowchart of FIG. 7 is finished. It is noted that the video stream may be output to the recording device, and recorded in the recording medium. In this configuration, the video stream may be recorded without being decoded.

Further, data received at each bit rate according to a communication rate may be directly recorded, or may be recorded after reconstruction of each video stream having been integrated and combined.

As apparent from the above description, the streaming system according to the first embodiment performs encoding processing by designating the I-picture having either bit rate, as an image used for decoding the P-picture, for each video stream. Upon decoding, the designated I-picture is decoded, and the decoded I-picture is used to decode the P-pictures of the GOP designated by the user.

Normally, in the adaptive streaming system using the multiple encoding, the video streams are generated upon conversion of the video source by the encoder to the video streams having a plurality of different bit rates, and the video streams are all independent of each other. Therefore, timing allowing switching of the video stream is limited to timing allowing random access between the video streams (timing of the I-picture at the head of the GOP).

However, in the streaming system according to the first embodiment, the P-pictures of each GOP are decoded using the I-picture previously designated. Therefore, as indicated by KT1 to KT4 of FIG. 5, the video stream can be switched in timing of the I-picture and in timing of all P-pictures of each GOP. Therefore, in the adaptive streaming system using the multiple encoding, the timing allowing switching of the video stream can be increased.

Further, even if a video is transmitted on a network having a bad condition, the streaming system according to the first embodiment readily acquires the video stream having a lower bit rate, and deterioration in quality of the video can be prevented. Further, a delay can be prevented which is caused by the longer buffering time required to accomplish the acquisition of the whole video stream within the reproduction time of the video stream.

Second Embodiment

Next, the streaming system according to a second embodiment will be described. The above streaming system according to the first embodiment is configured to reference the I-picture of any of the GOPs, upon decoding other P-pictures. By contrast, the streaming system according to the second embodiment is configured so that the P-picture at the head is decoded with reference to the I-picture of any of the GOPs, and succeeding P-pictures are decoded with reference to a preceding P-picture having been decoded, respectively.

Figure 8:
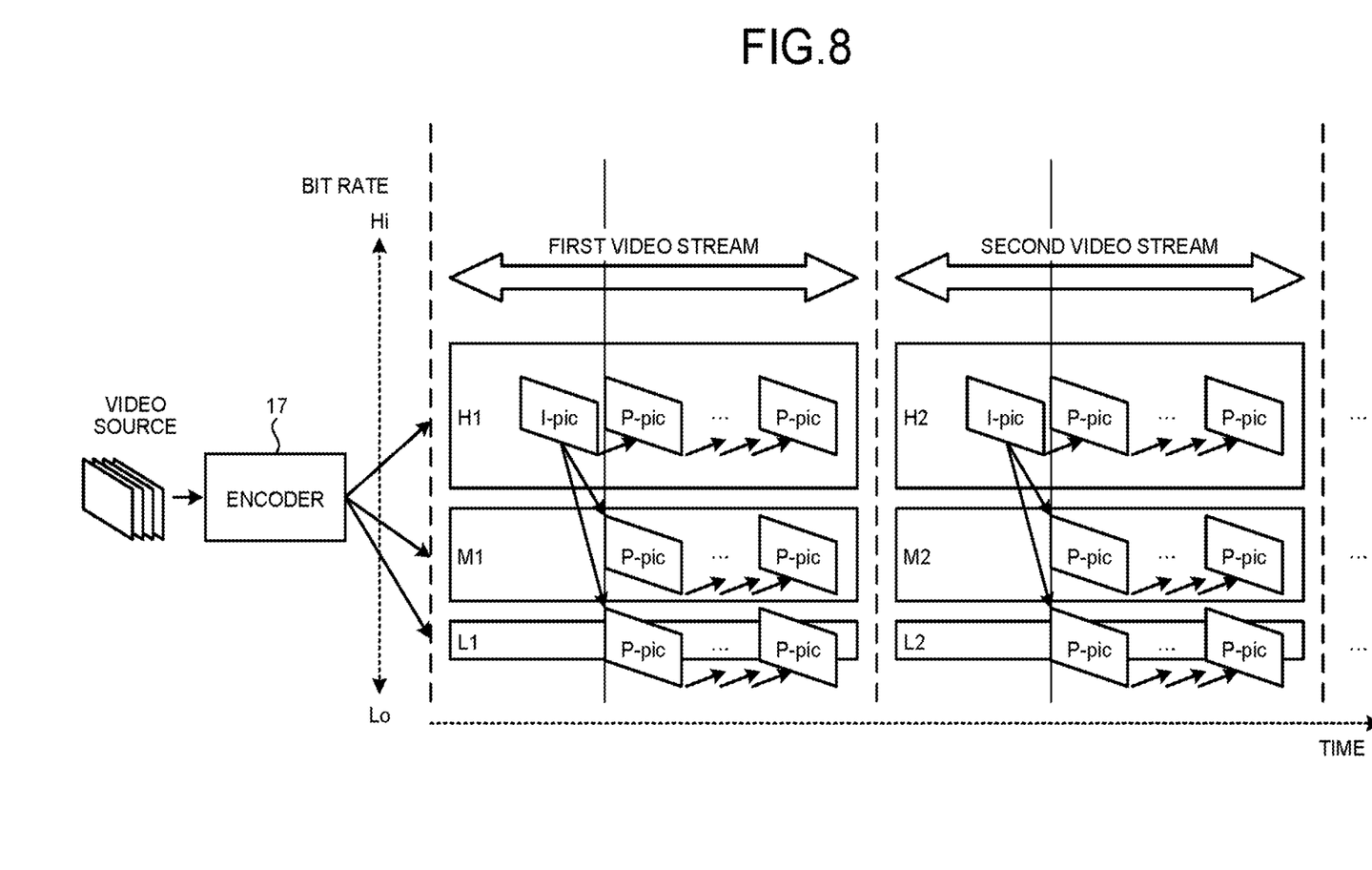
FIG. 8 is a schematic view illustrating an encoding operation of a server device provided in a streaming system according to a second embodiment.

FIG. 8 is a schematic view illustrating an encoding operation of such a streaming system according to the second embodiment. In this example, the encoder 17 encodes the video source by designating the I-picture of the GOP having a higher bit rate, as the image to be referenced upon decoding the P-picture at the head of the GOP having each bit rate, by the reference information or the reproduction control file. The encoder 17 encodes the video source by designating a preceding P-picture, as the image to be referenced upon decoding the second and subsequent P-pictures of the GOP having each bit rate, by the reference information or the reproduction control file.

In an example illustrated in FIG. 8, the I-picture is generated in the GOP having a higher bit rate. Therefore, the decoder 27 references the I-picture of the GOP having a higher bit rate, and decodes the P-picture at the head of the GOP having each bit rate. Further, the decoder 27 references the P-picture at the head decoded using the I-picture, and decodes the second P-picture. Further, the decoder 27 references the second P-picture decoded with reference to the P-picture at the head, and decodes the third P-picture. That is, the decoder 27 uses the P-picture having been decoded, positioned immediately before the P-picture to be decoded, and decodes the second and subsequent P-pictures.

Accordingly, as illustrated in FIG. 8, the streaming system according to the second embodiment can switch the video stream, in timing of the I-picture, and in timing of the P-pictures having been decoded of each GOP. Therefore, the streaming system according to the second embodiment can increase the timing allowing switching of the video stream, and an effect similar to that obtained in the above first embodiment can be obtained.

Third Embodiment

Next, the streaming system according to a third embodiment will be described. The above streaming system according to the second embodiment is configured so that the P-picture at the head is decoded with reference to the I-picture of any of the GOPs, and the succeeding P-pictures are decoded with reference to the preceding P-picture having been decoded, respectively. By contrast, the streaming system according to the third embodiment includes a P-picture decoded with reference to a P-picture of the GOP including the I-picture, in order to decode the succeeding P-pictures with reference to the preceding P-picture having been decoded.

Figure 9:
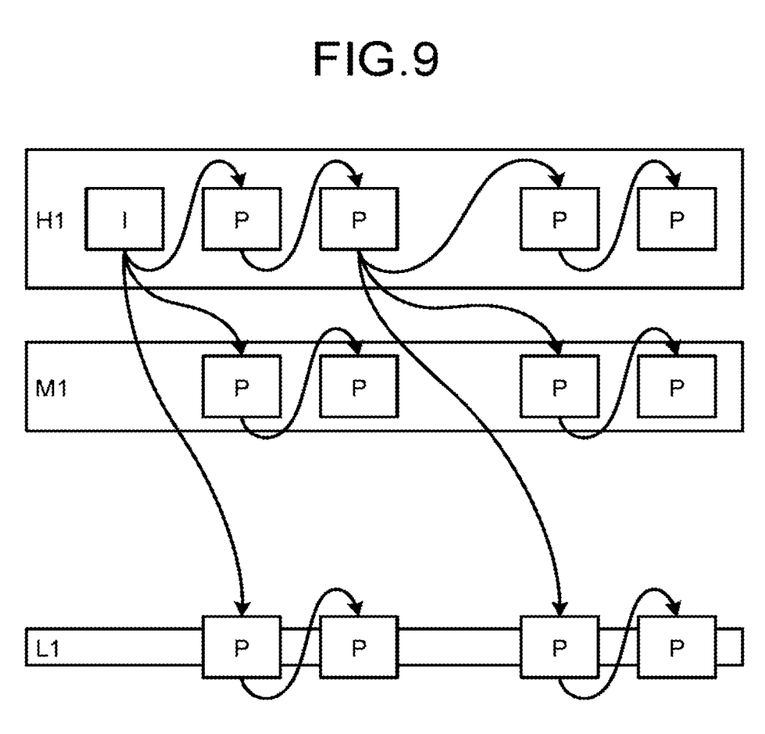
FIG. 9 is a schematic view illustrating an encoding operation of a server device provided in a streaming system according to a third embodiment.

FIG. 9 is a schematic view illustrating an encoding operation of such a streaming system according to the third embodiment. In this example, the encoder 17 encodes the video source by designating the I-picture of the GOP having a higher bit rate, as the image to be referenced upon decoding the P-picture at the head of the GOP having each bit rate, by the reference information or the reproduction control file. Further, the encoder 17 encodes the video source by designating a preceding P-picture, as the image to be referenced upon decoding the second and subsequent P-pictures of the GOP including the I-picture, by the reference information or the reproduction control file.

Further, the encoder 17 encodes the video source by designating a preceding P-picture, as the image to be referenced upon decoding the second P-picture of the GOP having a bit rate not including the I-picture, by the reference information or the reproduction control file. Further, the encoder 17 encodes the video source by designating the second P-picture of the GOP having a higher bit rate, as the image to be referenced upon decoding the third P-picture of the GOP having a bit rate not including the I-picture, by the reference information or the reproduction control file. Further, the encoder 17 encodes the video source by designating the preceding third P-picture of the GOP having a higher bit rate, as the image to be referenced upon decoding the fourth P-picture of the GOP having a bit rate not including the I-picture, by the reference information or the reproduction control file.

In an example illustrated in FIG. 9, the I-picture is generated in the GOP having a higher bit rate. Therefore, the decoder 27 references the I-picture of the GOP having a higher bit rate, and decodes the P-picture at the head of the GOP having each bit rate. Additionally, the decoder 27 decodes each P-picture of the GOP including the I-picture using a preceding P-picture.

Further, the decoder 27 decodes the second P-picture of a GOP not including the I-picture, using the P-picture at the head decoded using the I-picture. The decoder 27 decodes the third P-picture of the GOP not including the I-picture, with reference to the second P-picture of the GOP having a higher bit rate, including the I-picture. Further, the decoder 27 decodes the fourth P-picture of the GOP not including the I-picture, with reference to the preceding third P-picture. That is, the decoder 27 decodes a predetermined number of P-pictures, with reference to the I-picture or the P-picture of the GOP including the I-picture.

Therefore, the streaming system according to the third embodiment can provide an effect similar to that obtained in the above second embodiment, for example, switching of the video stream in timing of the I-picture and in timing of the P-picture at the head of each GOP, as illustrated in FIG. 9. In the streaming system according to the third embodiment, the switching is allowed only in one direction, i.e., from a video stream including a reference source I-picture or P-picture to a reference destination video stream. However, the streaming system according to the third embodiment references a preceding frame, so that the reference destination frame can have a reduced volume of data.

Fourth Embodiment

Next, the streaming system according to a fourth embodiment will be described. In the streaming system according to the fourth embodiment, each video stream includes the GOPs having the plurality of different bit rates, and a GOP including an image partially having a high quality image.

Figure 10:
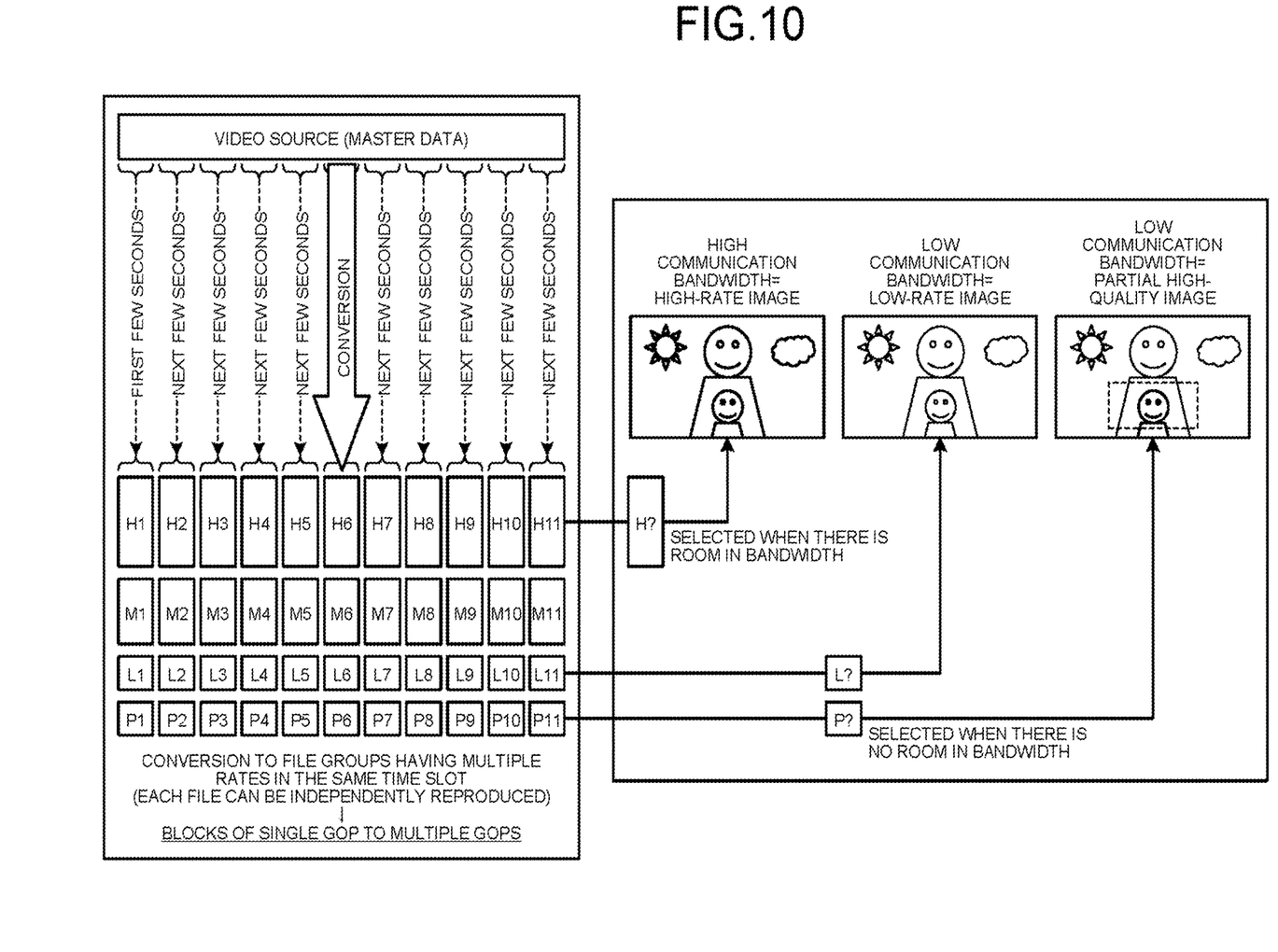
FIG. 10 is a schematic view illustrating an operation of a streaming system according to a fourth embodiment.

In the streaming system according to the fourth embodiment, as illustrated in FIG. 10, the encoder 17 of the server device 1 encodes the video source so that each video stream includes the GOP having a partial high-quality bit rate, in addition to the GOPs having the plurality of different bit rates. That is, "H", "SM", "L", and "P" of FIG. 10 denote the GOP having a higher bit rate, the GOP having a medium bit rate, the GOP having a lower bit rate, and the GOP having a partial high-quality lower bit rate, respectively. That is, the GOP having a partial high-quality lower bit rate is a GOP having a low quality image. A part or parts of the low quality image include a high quality image. Further, "H1", "M1", "L1", and "P1" denote the GOPs included in the first video stream. Similarly, "H2", "M2", "L2", and "P2" denote the GOPs included in the second video stream, and "H3", "M3", "L3", and "P3" denote the GOPs included in the third video stream.

Further, the GOPs of the respective video streams have configurations as described in the first to third embodiments, respectively. That is, each GOP of each video stream is configured so that the P-pictures are decoded with reference to the I-picture having either bit rate. Alternatively, each GOP of each video stream is configured so that the P-pictures are decoded with reference to a P-picture having been decoded with reference to the I-picture having either bit rate.

It is noted that, in this example, the GOP having a lower bit rate includes a partial high-quality image, but the GOP having a medium bit rate or the GOP having a higher bit rate may include the partial high-quality image.

In the client device 2, the decoder 27 measures the communication bandwidth during reception of the video stream. The decoder 27 selects a bit rate to be received next and receives the video stream, according to the measured communication bandwidth.

Specifically, when there is available communication bandwidth, the decoder 27 selects, receives, and decodes the GOP having a higher bit rate. By contrast, when there is no available communication bandwidth, the decoder 27 selects and decodes the GOP having a lower bit rate. Further, when there is no available communication bandwidth, the decoder 27 selects, receives, and decodes the GOP having a partial high-quality lower bit rate in order to obtain a high-quality image. When the GOP having a partial high-quality lower bit rate is selected, an image having a partial high-quality image at a desired part can be obtained while the GOP having a lower bit rate is smoothly received.

Such a streaming system according to the fourth embodiment is configured so that, when the streaming system handling the GOP having a partial high-quality image is achieved by switching the video stream according to the adaptive streaming, the number of combinations of video data to be generated can be reduced to reduce response delay, and an effect similar to that obtained in the above embodiments can be obtained.

Fifth Embodiment

Next, the streaming system according to a fifth embodiment will be described. Even if an image having a higher bit rate is employed, partial zoom up makes the image blurred. Therefore, the streaming system according to the fifth embodiment is configured so that a partial high-quality image selected from the entire image is distributed, and the user can see a desired part of the entire image having a high-quality.

Figure 11:
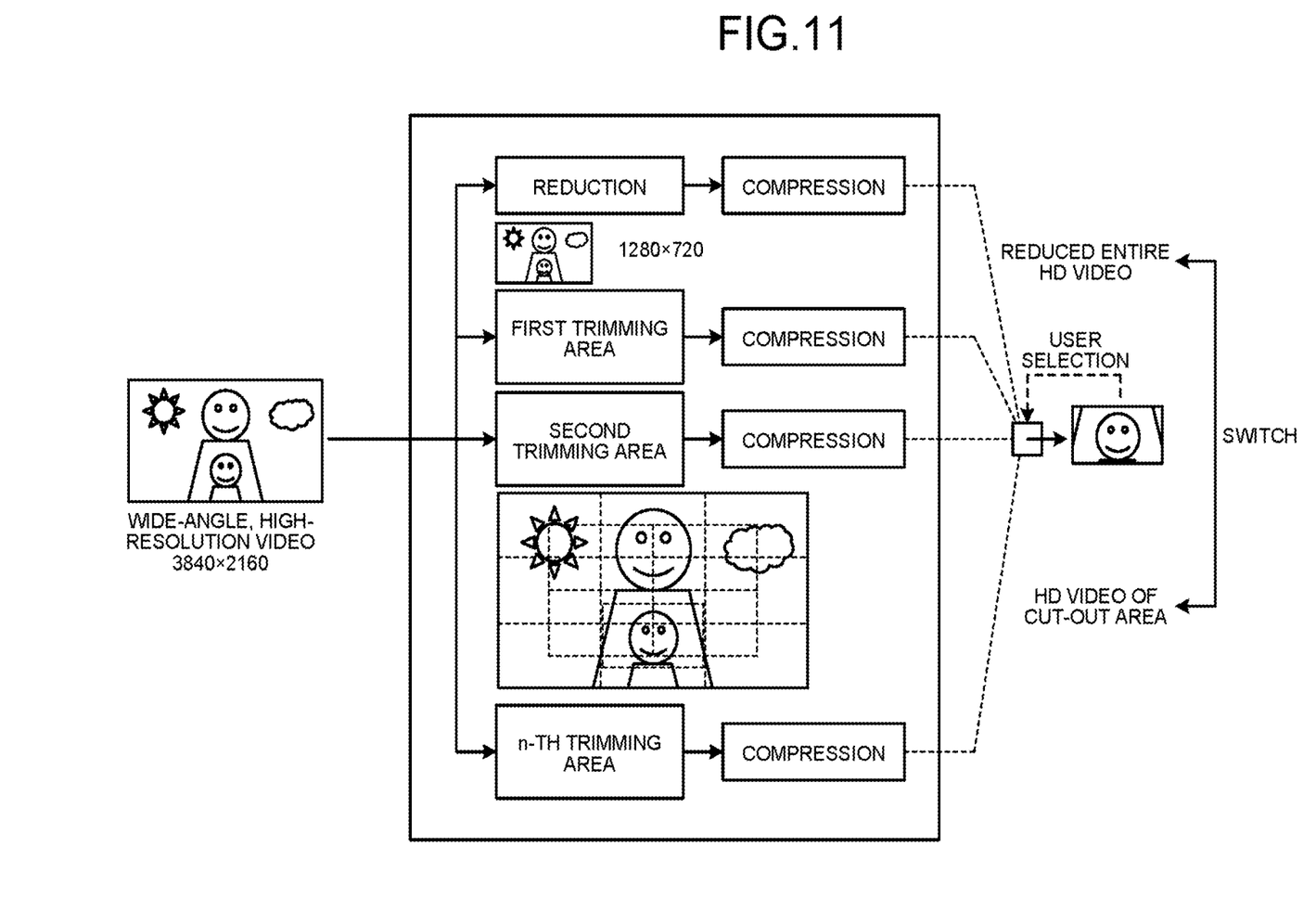
FIG. 11 is a schematic view illustrating an operation of a streaming system according to a fifth embodiment.

FIG. 11 is a schematic view illustrating generation of an image in the streaming system according to the fifth embodiment. In the streaming system according to the fifth embodiment, as illustrated in FIG. 11, the encoder 17 of the server device 1 employs a wide-angle, high-resolution video source of, for example, 3840 pixels by 2160 pixels. The encoder 17 generates a GOP of a reduced image obtained by reducing the wide-angle, high-resolution video source into 1280 pixels by 720 pixels. Further, the encoder 17 divides the wide-angle, high-resolution video source into trimming areas having a predetermined number of pixels. The encoder 17 generates a GOP of each trimming area. First to n-th trimming areas illustrated in FIG. 11 represent trimming areas each having the predetermined number of pixels, obtained by dividing the wide-angle, high-resolution video source, respectively. In the n-th trimming area, "n" is a natural number.

Further, the streaming system according to the fifth embodiment is configured so that, in the GOP of each trimming area, the P-pictures are decoded with reference to the I-picture of the GOP, for example, of the reduced image, as described in the first embodiment (see FIGS. 5 and 6). Alternatively, the streaming system according to the fifth embodiment is configured so that the P-picture at the head of the GOP of each trimming area is decoded with reference to the I-picture of the GOP of the reduced image, and subsequently, the succeeding P-pictures are decoded with reference to a preceding P-picture having been decoded, as described in the second embodiment (see FIG. 8). Alternatively, the streaming system according to the fifth embodiment is configured so that, when the P-picture is decoded in the GOP of each trimming area, the P-pictures of the GOP of each trimming area are decoded using the I-picture of the GOP of the reduced image or the P-picture having been decoded of the GOP of the reduced image, as described in the third embodiment (see FIG. 9).

Figure 12:
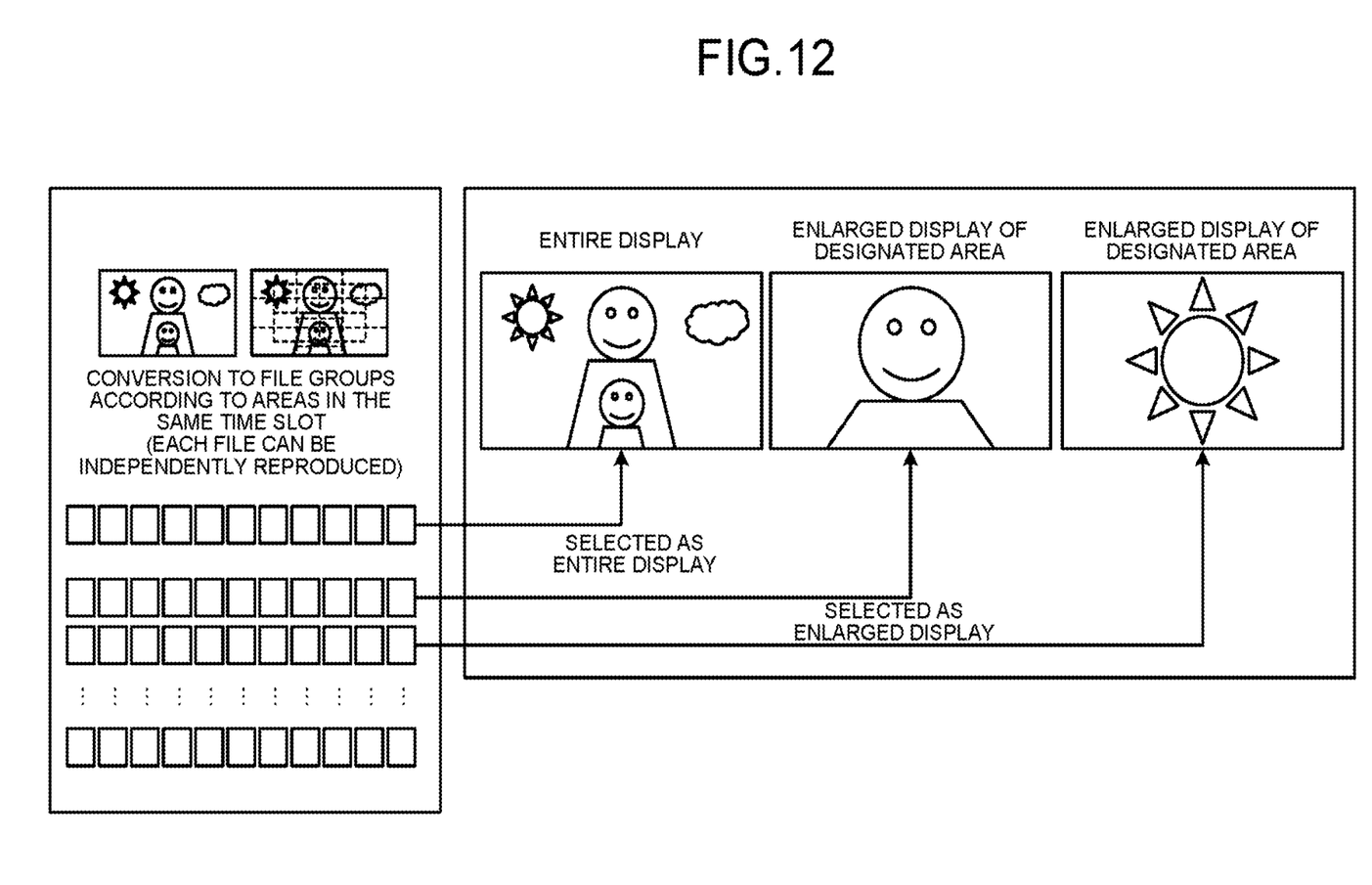
FIG. 12 is a schematic view illustrating an operation of the streaming system according to the fifth embodiment.

Next, FIG. 12 is a diagram illustrating a distribution mode of the video stream in the streaming system according to the fifth embodiment. In the streaming system according to the fifth embodiment, the user receives a reduced entire image in the client device 2. The decoder 27 of the client device 2 decodes the received entire image, and displays the decoded image on the monitor device. Next, in the client device 2, when the user designates a desired area in the entire image, the decoder 27 makes a request for transmission of an image of a designated area designated by the user, to the server device 1. The server device 1 encodes a high-resolution zoomed image of the designated area corresponding to the request for transmission of the image, and transmit the encoded image to the client device 2. The first to n-th trimming areas illustrated in FIG. 11 each represent a high-resolution zoomed image (GOP of trimming area) of each designated area designated by the user. The decoder 27 receives and decodes the transmitted high-resolution zoomed image, and displays the decoded image on the monitor device. Therefore, the partial high-quality image corresponding to the desired part of the entire image can be seen without blur.

When a high-quality zoomed image of another part is required, the user further designates another desired part from the reduced entire image. Thereby, a partial high-quality zoomed image designated by the user is distributed from the server device 1, similarly to the above description. The zoomed image distributed from the server device 1 is decoded, and the zoomed image can be seen through the monitor device.

As in the fourth embodiment, such a streaming system according to the fifth embodiment is also configured so that, when the streaming system handling the partial high-quality zoomed image is achieved by switching the video stream using the adaptive streaming, the number of combinations of the video data to be generated can be reduced to reduce response delay, and an effect similar to that obtained in the above embodiments can be obtained.

It is noted that, in the fifth embodiment, the GOP for display of the entire image is generated by reducing the wide-angle, high-resolution video source of, for example, 3840 pixels by 2160 pixels into 1280 pixels by 720 pixels. In the fifth embodiment, the I-picture (P-picture in some cases) of the GOP for display of the entire image reduced into 1280 pixels by 720 pixels is used as a reference image to decode the P-picture of each trimming area.

However, only an original resolution of the GOP including the I-picture referenced as the reference image upon decoding may be kept intact, and each GOP succeeding the GOP including the I-picture may be a GOP generated using the reduced image. In this configuration, the GOP including the I-picture is generated from the wide-angle, high-resolution video source of 3840 pixels by 2160 pixels. Further, the GOP of each trimming area succeeding the GOP including the I-picture is generated based on the video source of 1280 pixels by 720 pixels obtained by reducing the video source of 3840 pixels by 2160 pixels.

Therefore, each P-picture of the GOP of each trimming area is decoded with reference to the I-picture (P-picture in some cases) generated based on the wide-angle, high-resolution video source of 3840 pixels by 2160 pixels. Thus, a high-quality image (image without blur) of the trimming area or the like can be obtained. It is noted that, when it is apparent that there is no available network communication bandwidth, the client device 2 may make a transmission request or the server device 1 may make a distribution so that the first GOP including the I-picture corresponding to only the same part as the trimming area is transferred.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device, comprising:
one or more processors configured to:
receive a first stream generated by encoding a video source at a first bit rate, the first stream including a first intra-coded image and one or more first inter-coded images,
decode the first intra-coded image,
decode the one or more first inter-coded images by using the first intra-coded image as a reference image,
receive, if a selected bit rate is switched from the first bit rate to a second bit rate differing from the first bit rate at a first timing, a second stream generated by encoding a video source, which is a same video source as the video source used to generate the first stream, at the second bit rate, the second stream including one or more second inter-coded images without including any intra-coded images, the second inter-coded images having reproduction timings in synchronization with the first inter-coded images that have reproduction timings after the first timing, each of the second inter-coded images including one or more high-quality areas and one or more low-quality areas, and
decode the second inter-coded images by using the first intra-coded image as a reference image that is included in the received first stream, wherein
the one or more processors are further configured to:
receive the second stream if a selected bit rate is switched from the first bit rate to the second bit rate and if reproduction of a partial high-quality image is designated, and
receive, if the selected bit rate is switched from the first bit rate to a third bit rate, a third stream generated by encoding the same video source as the video source used to generate the first stream, at the third bit rate, the third stream including one or more third inter-coded images and not including any intra-coded images, each of the third inter-coded images not including any high-quality areas, and
the second bit rate and the third bit rate are lower than the first bit rate.

2. The communication device according to claim 1, wherein the first timing is one of a plurality of reproduction timings of the first inter-coded images.

3. The communication device according to claim 1, wherein the one or more processors are further configured to decode all of the second inter-coded images included in the second stream by using the first intra-coded image.

4. The communication device according to claim 1, wherein the one or more processors are further configured to:
decode one of the second inter-coded images included in the second stream using the first intra-coded image, and
decode another of the second inter-coded images by using the decoded one of the second inter-coded images.

5. A communication device, comprising:
one or more processors configured to:
encode a video source at a first bit rate to generate a first stream that includes a first intra-coded image and one or more first inter-coded images that are encoded by using the first intra-coded image as a reference image, encode a video source, which is a same video source as the video source used to generate the first stream, at a second bit rate differing from the first bit rate to generate a second stream that includes one or more second inter-coded images without including any intra-coded images, the second inter-coded images being encoded by using the first intra-coded image as a reference image that is included in the first stream, the second inter-coded images having reproduction timings in synchronization with the first inter-coded images, each of the second inter-coded images including one or more high-quality areas and one or more low-quality areas, and encode a video source, which is the same video source as the video source used to generate the first stream, at a third bit rate differing from the first bit rate to generate a third stream including one or more third inter-coded images and not including any intra-coded images, each of the third inter-coded images not including any high-quality areas, wherein the second bit rate and the third bit rate are lower than the first bit rate.

6. The communication device according to claim 5, wherein the one or more processors are further configured to:

transmit the first stream when the first bit rate is selected, and transmit, if a selected bit rate is switched from the first bit rate to the second bit rate at a first timing, the second stream including the second inter-coded images having reproduction timings after the first timing.

7. The communication device according to claim 6, wherein the first timing is one of a plurality of reproduction timings of the first inter-coded images.

8. The communication device according to claim 5, wherein the one or more processors are further configured to encode all of the second inter-coded images included in the second stream by using the first intra-coded image.

9. The communication device according to claim 5, wherein the one or more processors are further configured to:

encode one of the second inter-coded images included in the second stream by using the first intra-coded image, and encode another of the second inter-coded images by using the one of the second inter-coded images encoded with the first intra-coded image.

10. A streaming system, comprising:
a transmitting device; and
a receiving device, wherein
the transmitting device includes one or more processors configured to:
encode a video source at a first bit rate to generate a first stream that includes a first intra-coded image and one or more first inter-coded images that are encoded by using the first intra-coded image as a reference image, encode a video source, which is a same video source as the video source used to generate the first stream, at a second bit rate differing from the first bit rate to generate a second stream that includes one or more second inter-coded images without including any intra-coded images, the second inter-coded images being encoded by using the first intra-coded image as a reference image that is included in the first stream, the second inter-coded images having reproduction timings in synchronization with the first inter-coded images, each of the second inter-coded images including one or more high-quality areas and one or more low-quality areas, and encode a video source, which is the same video source as the video source used to generate the first stream, at a third bit rate differing from the first bit rate to generate a third stream including one or more third inter-coded images and not including any intra-coded images, each of the third inter-coded images not including any high-quality areas, wherein the second bit rate and the third bit rate are lower than the first bit rate.

11. A streaming method, comprising:

encoding, using one or more processors, a video source at a first bit rate to generate a first stream that includes a first intra-coded image and one or more first inter-coded images that are encoded by using the first intra-coded image as a reference image;

encoding, using the one or more processors, a video source, which is a same video source as the video source used to generate the first stream, at a second bit rate differing from the first bit rate to generate a second stream that includes one or more second inter-coded images without including any intra-coded images, the second inter-coded images being encoded by using the first intra-coded image as a reference image that is included in the first stream, the second inter-coded images having reproduction timings in synchronization with the first inter-coded images, each of the second inter-coded images including one or more high-quality areas and one or more low-quality areas; and encoding, using the one or more processors, a video source, which is the same video source as the video source used to generate the first stream, at a third bit rate differing from the first bit rate to generate a third stream including one or more third inter-coded images and not including any intra-coded images, each of the third inter-coded images not including any high-quality areas, wherein the second bit rate and the third bit rate are lower than the first bit rate.

12. The communication device according to claim 1, wherein the third bit rate is equal to or higher than the second bit rate.

\* \* \* \* \*